(12) United States Patent
Mujkic et al.

(10) Patent No.: US 9,026,946 B2
(45) Date of Patent: May 5, 2015

(54) METHOD AND APPARATUS FOR DISPLAYING AN IMAGE

(75) Inventors: Alen Mujkic, Mississauga (CA); Scott Arnold, Etobicoke (CA); John Paul Hayman, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/204,838

(22) Filed: Aug. 8, 2011

(65) Prior Publication Data

US 2013/0038627 A1 Feb. 14, 2013

(51) Int. Cl.
*G06F 3/033* (2013.01)
*G09G 5/00* (2006.01)
*G06F 9/44* (2006.01)

(52) U.S. Cl.
CPC .......... *G09G 5/00* (2013.01); *G09G 2340/0407* (2013.01); *G09G 2340/0442* (2013.01); *G09G 2340/0464* (2013.01); *G09G 2340/0492* (2013.01); *G09G 2340/12* (2013.01); *G09G 2340/14* (2013.01); *G06F 9/4443* (2013.01); *G09G 2340/10* (2013.01)

(58) Field of Classification Search
CPC .................................................. G06F 9/4443
USPC ........................................................ 715/838
See application file for complete search history.

(56) References Cited

U.S. PATENT DOCUMENTS

| | | | |
|---|---|---|---|
| 6,310,648 B1 * | 10/2001 | Miller et al. | 348/333.05 |
| 6,973,222 B2 * | 12/2005 | Haeberli | 382/283 |
| 2005/0210414 A1 * | 9/2005 | Angiulo et al. | 715/838 |
| 2006/0036950 A1 * | 2/2006 | Himberger et al. | 715/732 |
| 2006/0155612 A1 * | 7/2006 | Haeberli | 705/26 |
| 2008/0052945 A1 | 3/2008 | Matas et al. | |
| 2009/0103144 A1 * | 4/2009 | Kim | 358/474 |
| 2010/0027958 A1 * | 2/2010 | Ubillos | 386/4 |
| 2011/0099471 A1 * | 4/2011 | Manijak et al. | 715/274 |
| 2011/0113379 A1 * | 5/2011 | Doucet et al. | 715/838 |
| 2012/0017180 A1 * | 1/2012 | Flik et al. | 715/838 |
| 2012/0046080 A1 * | 2/2012 | Koh et al. | 455/566 |

(Continued)

FOREIGN PATENT DOCUMENTS

EP 1798690 A1 6/2007

OTHER PUBLICATIONS

Extended European Search Report mailed Nov. 25, 2011. In corresponding application No. 11176796.8.

(Continued)

*Primary Examiner* — William Bashore
*Assistant Examiner* — Henry Orr
(74) *Attorney, Agent, or Firm* — Fish & Richardson P.C.

(57) ABSTRACT

An electronic device and a method of operation thereof for facilitating the provision of an image as a background wallpaper of a user interface for display on a display of an electronic device, the device being configured to display the user interface and wallpaper in first and second different orientations during use, comprising: generating, based on the image, a first thumbnail representation of the appearance of the display having the image as the background wallpaper in a first orientation; generating, based on the image, a second thumbnail representation of the appearance of the display having the image as the background wallpaper in a second orientation; and simultaneously displaying on the display the first and second thumbnails.

17 Claims, 9 Drawing Sheets

(56) References Cited

U.S. PATENT DOCUMENTS

2012/0315954 A1* 12/2012 Ahn et al. .................. 455/556.1
2013/0038627 A1* 2/2013 Mujkic et al. ................. 345/619

OTHER PUBLICATIONS

Response to the Extended European Search Report filed Aug. 15, 2012; in corresponding European patent application No. 11176796.8.

Extended European Search Report mailed Nov. 25, 2011; in corresponding European patent application No. 11176796.8.

Canadian Office Action mailed May 14, 2014; in corresponding Canadian patent application No. 2,782,130.

Response to Examiner's Report of May 14, 2014; in Canadian patent application No. 2,782,130.

Office Action issued in Canadian Application No. 2,782,130 on Mar. 17, 2015; 3 pages.

* cited by examiner

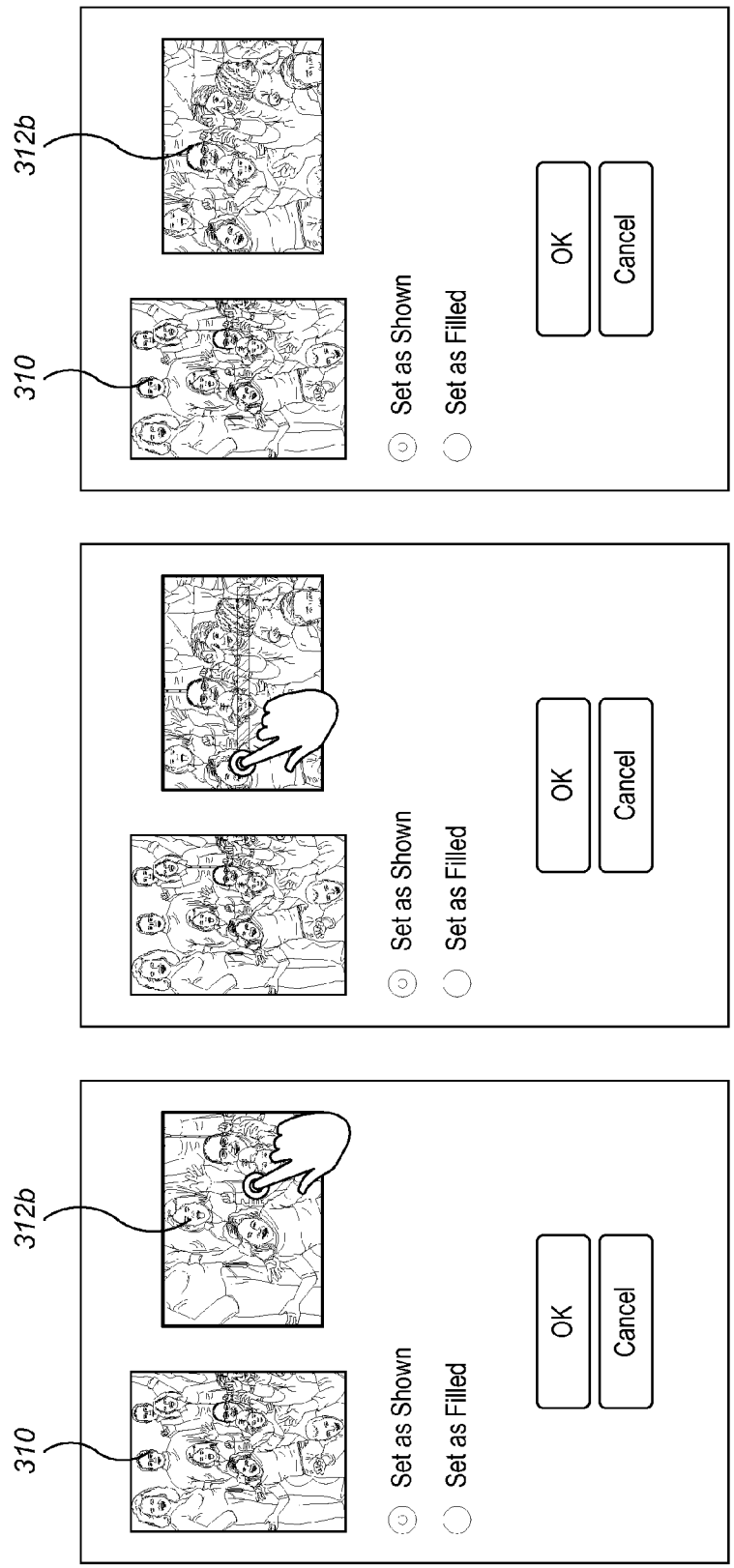

:::page-number
US 9,026,946 B2
:::

METHOD AND APPARATUS FOR DISPLAYING AN IMAGE

TECHNICAL FIELD

The disclosed embodiments relate to an electronic device and method of operation thereof. More specifically, the embodiments relate to an electronic device configured to provide functionality usable to facilitate the selection of an image as a background wallpaper of a user interface for display on a display of the electronic device in multiple orientations. In embodiments, the electronic device is a portable electronic device.

BACKGROUND

Electronic devices are in many cases provided with one or more displays for providing visual information to users of the devices. The electronic devices can be provided with user interfaces for display on the display of the device for facilitating user interaction with, and operation of, the device via one or more user inputs. The user interfaces comprise visual elements that can be arranged in various manners on the screen and can represent, for example, executable software programs, menu items indicating selectable functionality or operations available to the user within programs, a state of some aspect of program or data or other function of the device, etc. User inputs such as trackpads, trackballs, mice, cursors, touch screens and multitouch screens, can provide pointer-type controls usable to adjust the position of a pointer in multiple dimensions to allow interaction with the user interface by, for example, enabling navigation through menu systems, options, file systems, program shortcuts etc, and enabling selection and manipulation of visual elements and the items they represent. Many such electronic devices have user interfaces that provide one or more homescreens that are presented to a user as a starting point for operating the device, or when the device is powered on and 'awake' but idle, waiting to be used, from which a user can typically easily access and operate the device in accordance with its potential available end-user functionality.

Functionality enabling the customisation of user interfaces by the end user is often provided as a desirable mechanism to personalise electronic devices. Such personalisation of the user interface facilitates user interaction with the device and can give an improved end-user experience. One such customisation option that is commonly offered in graphical user interfaces is the ability to select an image for use as a background wallpaper of the user interface, for example, for display as a background of a homescreen of the device. Of course, wallpaper images may be used in views of the user interface other than the homescreen and such wallpapers could permeate through a significant proportion of the views of the user interface. Wallpaper images may be selectable from a library of purpose-designed wallpaper images, user-created images (using, for example, a built-in image capture device), downloaded/received images, etc. Such background wallpaper is typically displayed at least as a background of a homescreen of a device. One or more background wallpaper images may of course be selectable for use in different contexts on the device. For example, on a portable electronic device homescreen, a wallpaper image may vary dependent on some detected condition such as a selected menu option, a date, a weather condition, etc.

Electronic devices can be provided with means usable to indicate an orientation of the device to the device itself, such as one or more accelerometers. These provides a technical means of a user input and can be used to control the device, or to facilitate a user's interaction with the device by controlling aspects of the user interface, such as the presentation of the user interface on the display. For example, the user interface of a device can be altered to facilitate interaction with the device as the device is rotated by the user in use and changes in the orientation of the device are indicated. For example, the user interface may change its configuration so that it appears aligned and 'upright' as the device is rotated, for example turned on its side. This change in configuration of the user interface may happen in 90 degree stages, for example, switching between 'portrait' and 'landscape' configurations as the device is rotated a quarter turn while pointing generally upwards. The background wallpaper may be rotated with the user interface as the device is rotated in use.

BRIEF DESCRIPTION OF THE DRAWINGS

The present disclosure and the embodiments set out herein can be better understood by reference to the description of the embodiments set out below, in conjunction with the appended drawings which can be described as follows.

FIGS. 4A-4C illustrate a display of a portable electronic device in accordance with another embodiment showing the operation of a user interface including the manipulation of a thumbnail preview of an image selection for facilitating the selection of an image as a background wallpaper for the user interface of the device.

DESCRIPTION OF EMBODIMENTS

Figure 1:
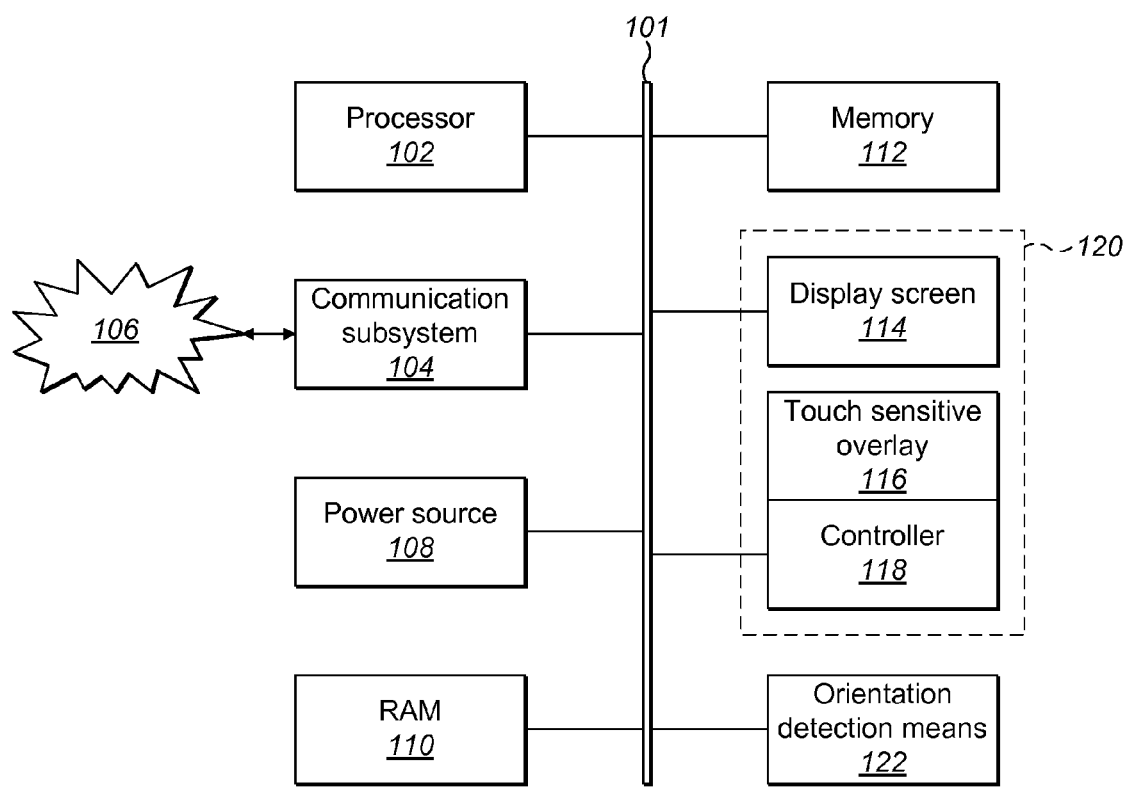
FIG. 1 is a block diagram illustrating a portable electronic device usable in accordance with example embodiments.

Embodiments set out in this application relate generally to a method of facilitating the selection of an image as a background wallpaper of a user interface for display on a display of an electronic device. The device may be configured to display the user interface and selected wallpaper in first and second orientations during use. Embodiments of the invention facilitate the selection of an image for use as the background wallpaper and its formatting for display in different orientations such that an acceptable view of the image is provided irrespective of the orientation of the user interface and of the device.

In accordance with one embodiment there is provided a method of facilitating the provision of an image as a background wallpaper of a user interface for display on a display of an electronic device, the device being configured to display the user interface and wallpaper in first and second different orientations during use, comprising: generating, based on the image, a first thumbnail representation of the appearance of the display having the image as the background wallpaper in a first orientation; generating, based on the image, a second thumbnail representation of the appearance of the display having the image as the background wallpaper in a second orientation; and simultaneously displaying on the display the first and second thumbnails.

In certain embodiments, the method may further comprise providing functionality allowing the user to selectably cause the generation and display of different pairs of first and second thumbnails in which the image is represented in different ways to provide the background wallpaper. In certain embodiments, in a selectable pair of thumbnails the representation of the image may be based on a user-defined view of the image. The user-defined view of the image may be generated by user interaction with an image viewer application. In certain embodiments, in a selectable pair of thumbnails the representation of the image is based on the original image.

In certain embodiments, in a selectable pair of thumbnails the representation of the image or the representation of the user-defined view of the image may be sized: identically in both thumbnails; or to fill the area of the thumbnail representing the area for the background wallpaper; or so that the its entire extent is displayed in the area of the thumbnail representing the area for the background wallpaper; or so that its full width is displayed in the area of the thumbnail representing the area for the background wallpaper; or so that its full height is displayed in the area of the thumbnail representing the area for the background wallpaper.

In certain embodiments, the aspect ratio of the image may be maintained in the first and second thumbnails.

In certain embodiments, the method may further comprise providing user interface functionality enabling the user to select the use of the image as the background wallpaper based on the selected thumbnail images. The method may further comprise generating first and second versions of the image in accordance with the representation of the image in the selected thumbnails for use as the background wallpaper in the first and second orientations.

In certain embodiments, the first and second orientations may correspond to portrait and landscape.

In certain embodiments, the method may further comprise providing user interface functionality enabling the user to separately manipulate the representation of the image shown in each of the first and second thumbnails to adjust how the image would appear as a wallpaper background in that orientation. The display may be a multitouch display and the manipulation of the representation of the image may be achieved by the user manipulating the multitouch display. The user interface functionality may be such that the representation of the image as the wallpaper background in a thumbnail is adjustable by directly manipulating the thumbnail itself. Alternatively, or in addition, the user interface functionality may be such that the representation of the image as the wallpaper background in a thumbnail is adjustable by providing a full screen representation of the appearance of the display having the image as the background wallpaper corresponding to and in response to a selection of a thumbnail for adjustment, the representation of the image as the wallpaper background in the full screen representation being directly manipulatable.

In certain embodiments, the thumbnails may include representations of visual elements of the user interface that can appear in relation to the background wallpaper in use.

In certain embodiments, the thumbnails may be simultaneously displayed having the same orientation on the display.

In accordance with another embodiment there is provided an electronic device comprising: a display; one or more processors; and memory comprising instructions for facilitating the provision of an image as a background wallpaper of a user interface for display on the display, the device being configured to display the user interface and wallpaper in first and second orientations during use, which when executed by one or more of the processors cause the electronic device to: generate, based on the image, a first thumbnail representation of the appearance of the display having the image as the background wallpaper in a first orientation; generate, based on the image, a second thumbnail representation of the appearance of the display having the image as the background wallpaper in a second orientation different from the first orientation; and simultaneously display on the display the first and second thumbnails.

In certain embodiments, the electronic device may further comprise means for detecting the orientation of the device, the device being configured to select the orientation of the displayed user interface based on the detected orientation of the device.

In certain embodiments, the instructions may provide functionality allowing the user to selectably cause the generation and display of different pairs of first and second thumbnails in which the image is represented in different ways to provide the background wallpaper. In certain embodiments, in a selectable pair of thumbnails the representation of the image may be based on a user-defined view of the image. The user-defined view of the image may be generated by user interaction with an image viewer application. In certain embodiments, in a selectable pair of thumbnails the representation of the image is based on the original image.

In certain embodiments, in a selectable pair of thumbnails the representation of the image or the representation of the user-defined view of the image may be sized: identically in both thumbnails; or to fill the area of the thumbnail representing the area for the background wallpaper; or so that the its entire extent is displayed in the area of the thumbnail representing the area for the background wallpaper; or so that its full width is displayed in the area of the thumbnail representing the area for the background wallpaper; or so that its full height is displayed in the area of the thumbnail representing the area for the background wallpaper.

In certain embodiments, the aspect ratio of the image may be maintained in the first and second thumbnails.

In certain embodiments, the instructions may provide user interface functionality enabling the user to select the use of the image as the background wallpaper based on the selected thumbnail images. The method may further comprise generating first and second versions of the image in accordance with the representation of the image in the selected thumbnails for use as the background wallpaper in the first and second orientations.

In certain embodiments, the first and second orientations may correspond to portrait and landscape.

In certain embodiments, the instructions may provide user interface functionality enabling the user to separately manipulate the representation of the image shown in each of the first and second thumbnails to adjust how the image would appear as a wallpaper background in that orientation. The display may be a multitouch display and the manipulation of the representation of the image may be achieved by the user manipulating the multitouch display. The user interface functionality may be such that the representation of the image as the wallpaper background in a thumbnail is adjustable by directly manipulating the thumbnail itself. Alternatively, or in addition, the user interface functionality may be such that the representation of the image as the wallpaper background in a thumbnail is adjustable by providing a full screen representation of the appearance of the display having the image as the background wallpaper corresponding to and in response to a selection of a thumbnail for adjustment, the representation of the image as the wallpaper background in the full screen representation being directly manipulatable.

In certain embodiments, the thumbnails may include representations of visual elements of the user interface that can appear in relation to the background wallpaper in use.

In certain embodiments, the thumbnails may be simultaneously displayed having the same orientation on the display.

In accordance with another embodiment there is provided a computer program product comprising: memory comprising instructions for facilitating the provision of an image as a background wallpaper of a user interface for display on a display of an electronic device, the device being configured to display the user interface and wallpaper in first and second orientations during use, which when executed by one or more of the processors of the device cause the device to: generate, based on the image, a first thumbnail representation of the appearance of the display having the image as the background wallpaper in a first orientation; generate, based on the image, a second thumbnail representation of the appearance of the display having the image as the background wallpaper in a second orientation different from the first orientation; and simultaneously display on the display the first and second thumbnails.

The embodiments provide user interface functionality enabling a user to preview and, in certain embodiments adjust, how an image would appear as a background wallpaper in different orientations of display, before deciding whether or not to select the image for use as the background wallpaper based on the thumbnail previews. This provides significant advantages over electronic devices which provide no such functionality and instead only allow a user to select an image as a desktop background before the device automatically and rigidly applies pre-programmed, inflexible formatting to the image to provide the image as the background wallpaper in both orientations. The embodiments avoid the user finding out, only after applying the image as a background that it is in fact unsuitable for use as the background image in one or more orientations, due to, for example, the pre-programmed formatting applied by the device, or the positioning of visual elements of the user interface for example in the homescreen, causing the intended focus or important visual elements of the image to be obscured, off-centre, or cropped. This is a result of the electronic device being usable in multiple orientations detectable by, for example, one or more accelerometers. As a result of this technical functionality provided by the orientation detection means, the usability of the user interface in respect of the selection of the background wallpaper of the device is impaired. For example, an image may appear to be suitable for use as a background wallpaper when viewed in one orientation but turn out to be unsuitable in the other orientation. After the wallpaper is applied, it may be difficult to revert to the previous wallpaper image, or indeed, find any image that is suitable for use as a wallpaper in multiple orientations. Without the user interface functionality of embodiments of this application, the user of the electronic device would have no idea of the appearance of the display including the image as a background wallpaper until the image is applied as the wallpaper.

The user interface functionality provided in embodiments herein permits the user to preview by way of thumbnails the appearance of the display and user interface having the image as the background wallpaper before selecting the image for use as the wallpaper. In certain embodiments, the user may define a view of an image on which a wallpaper is to be based, and to provide thumbnail previews of the display including that view of the image as the background wallpaper. Certain embodiments even provide functionality enabling the user to manipulate the image (or view thereof) separately, in relation to each thumbnail (either in the thumbnail itself or in a separate, full screen preview), to adjust the representation of the image as the background wallpaper (for example the size/scaling, panning/focus, rotation of the image) in order to enable the user to achieve the desired view of the image as the background wallpaper in each orientation.

Thus user interface limitations that would otherwise result from an electronic device being usable in multiple orientations (e.g. portrait and landscape) can be avoided by the user interface functionality provided by embodiments set out in this application.

The disclosure generally relates to an electronic device, which, in embodiments described herein, is a portable electronic device. Examples of portable electronic devices include mobile, or handheld, wireless communication devices such as pagers, cellular phones, cellular smartphones, wireless organizers, personal digital assistants, wirelessly enabled notebook computers, wirelessly enabled tablet computers and so forth. The portable electronic device may also be a portable electronic device without wireless communication capabilities, such as a handheld electronic game device, digital photograph album, tablet computer, digital camera, or other device.

A block diagram of an example of a portable electronic device 100 in accordance with one or more embodiments is shown in FIG. 1. The portable electronic device 100 includes multiple components linked by a communications bus 101. A processor 102 controls the overall operation of the portable electronic device 100. Communication functions, including data and voice communications, are performed through a communication subsystem 104. The communication subsystem 104 receives messages from and sends messages to a wireless network 106 which may be any type of wireless network for voice communications or data communications or both. A power source 108, such as one or more rechargeable batteries or a port to an external power supply, powers the portable electronic device 100.

The processor 102 interacts with other components of the electronic device including Random Access Memory (RAM) 110, memory 112, a display screen 114 with a touch-sensitive overlay 116 operably connected to an electronic controller 118 that together comprise a touch-sensitive display screen 120, and a camera 121. Other device subsystems may be provided to enable additional functionality, such as additional user inputs.

The user interface including functionality of embodiments of the present invention is provided on touch-sensitive display screen 120 by the processor 102 executing instructions stored in RAM 110 and/or memory 112 to provide one or more elements of the user interface of the device 100. The instructions may be provided as a computer software product. The computer software product may be provided in, on or supported by a computer readable medium which could be provided as all possible permanent and non-permanent forms of computer readable medium either transitory in nature, such as in a data transmission signal for example sent over the internet, or non-transitory in nature such as in the RAM 110 of the device 100 or other, non-volatile storage such as memory 112. On the other hand the computer readable medium may be a non-transitory computer readable medium comprising all computer-readable media, with the sole exception being a transitory, propagating signal.

The portable electronic device 100 is in embodiments configured to display the user interface and wallpaper at least on a homescreen of the user interface in first and second different orientations during use. In this case, the display screen 114 has an unequal aspect ratio providing natural portrait and landscape use orientations. The user interface may rotate between portrait view and landscape view in response to a detection of an orientation of the device by orientation detection means 122. For example, when reading a page of text on the display 114, a user may naturally be inclined to hold the device 100 upright in portrait orientation such that the user interface displays the text on the display 114 like a book in portrait view. Similarly, when watching a video on the display 114 having an aspect ratio that lends itself to a landscape view, the user may hold the device 100 sideways such that the user interface displays the video on the display 114 in landscape view. When the device 100 provides a user interface or a part thereof having a wallpaper background, which may be user-defined based on an image stored in memory 112, the user interface, and the background wallpaper may be similarly displayed in multiple orientations, such as in portrait or landscape, for example, in response to the rotation of the device 100 by the user. Of course, more than two orientations of display, user interface and background wallpaper may be possible and are within the scope of the present invention. For example, opposite portrait and landscape views may be provided if the device 100 is rotated by 180 degrees relative to the original portrait and landscape orientations. Indeed, the user interface and the background wallpaper may effectively freely rotate to be aligned with the rotation of the device 100.

The touch-sensitive display screen 120 is controlled by the processor 102 to display on the display screen 114 information such as text, images and icons and a graphical user interface (GUI) of programs and of an operating system of the electronic device, which may be stored in the RAM 110 or memory 112 or both. A degree of user-interaction with the displayed information and with the graphical user interface (GUI) of programs and of an operating system is enabled through user manipulation of the touch-sensitive overlay 116 of the touch-sensitive display screen 120. The processor 102 interacts with the touch-sensitive overlay 116 via the electronic controller 118. The touch-sensitive display screen 120 may be of any suitable type, such as a capacitive, resistive, infrared, surface acoustic wave (SAW), optical, dispersive signal technology, acoustic pulse recognition, and so forth, as known in the art. A capacitive touch-sensitive display screen 120 includes a capacitive touch-sensitive overlay 116. The overlay 116 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display screen 120. Multiple simultaneous touches may be detected. The processor 102 may determine attributes of the touch, including a location of a touch, and may monitor any movement of the touch. Touch location and movement data may include an area of contact or a single point of contact, such as a point at or near a centre of the area of contact.

The location of a detected touch may include x and y components, e.g., horizontal and vertical components, respectively. A signal is provided to the controller 116 in response to detection of a touch, and this is in turn provided to the processor 102 which processes the signal. Certain touches or combinations of touches are recognised as gestures that lead to certain manipulations or operations of the GUI or of the information presented on the touch-sensitive display screen 120. By performing certain gestures on the touch-sensitive display screen 120, a user can interact with the GUI and control the applications and operating system of the portable electronic device.

The memory 112 may store a plurality of images in digital format that may be, for example, taken by the portable electronic device 100 using camera 121 or transmitted to the portable electronic device 100 over wireless network 106 via communication subsystem 104.

Memory 112 may store a picture viewer application that is usable to display on the display screen 114 images stored in memory 112.

Figure 2B:
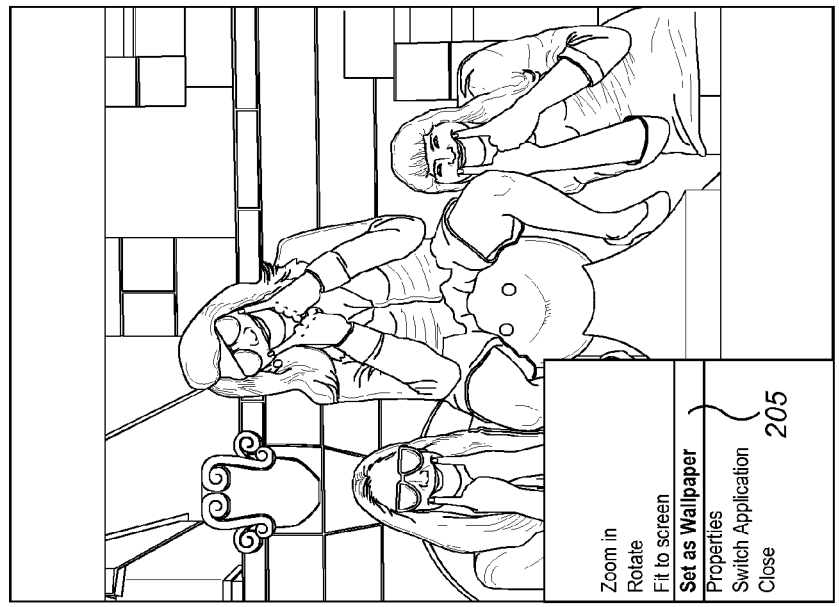
FIGS. 2A-2D illustrate a display of a portable electronic device in accordance with an embodiment showing the operation of a user interface for facilitating the selection of an image as a background wallpaper for the user interface of the device.
Figure 2A:

Referring to FIG. 2A, the picture viewer application may be loaded into RAM 110 and executed by processor 102 to provide a display area in this case taking up the entire extent of display 114 inside which images are displayed. In this case the device 100 is currently held upright so that the display screen, having a 360×480 pixel resolution, is arranged in portrait view. An image 200 of three girls is displayed and the orientation detection means 122, detecting the upright orientation of the device, causes the user interface and the picture viewer application to display the image 200 on the display upright in portrait orientation as shown in FIG. 2A. Should the user rotate the device 100 on its side, the orientation detection means 122 would detect this rotation and rotate the image 200 accordingly so it is once again aligned upright.

In this case the image 200 is square, having a 1:1 aspect ratio and a size of 1200×1200 pixels. As a result, to fit the full extent of the image 200 on the screen the image 200 is displayed having black borders at the top and bottom, or void spaces, representing the absence of any image data.

Should the user desire that this image is used as a background wallpaper, for example, for a homescreen of the device 100, the user may manipulate a user input, in this case the touch-sensitive display screen 120, so as to cause the user interface to display a menu 205 of options for operations on the image 200, and the user may select the "Set as Wallpaper" option as shown in FIG. 2B.

Selection of the "Set as Wallpaper" option triggers the device 100 to provide user interface functionality for facilitating the selection of an image as the background wallpaper in accordance with embodiments set out in this application.

In response to the selection of the "Set as Wallpaper" option, the device generates, in accordance with default wallpaper generation parameters set in the RAM 110 and based on the image 200, a first thumbnail representation 210a of the appearance of the display 114 having the image 200 as the background wallpaper in a first, in this case portrait, orientation. The device also generates, in accordance with default wallpaper generation parameters and based on the image 200, a second thumbnail representation 212a of the appearance of the display 114 having the image 200 as the background wallpaper in a second, in this case landscape, orientation.

The pair of thumbnails 210a and 212a are then simultaneously displayed on a wallpaper preview display screen (see FIG. 2C) with their orientations aligned such that the portrait thumbnail 210a is shown upright on the left of the landscape thumbnail 212a, also shown upright. The thumbnails 210a and 212a are generated including representations of visual elements of the user interface that can appear in relation to the background wallpaper in use, for example, on the homescreen of the device 100. In this case, the homescreen of the user interface of device has a semi-transparent black shadowed bar overlaying the top 20% of the homescreen showing the time, and another semi-transparent black shadowed bar overlaying the bottom 30% of the homescreen to display four icons representing shortcuts to applications of the electronic device 100. These are represented in the thumbnails, but only placeholder visual elements are provided on the bottom bar in place of the actual shortcuts. In this way the user can see if the intended focus of the image would be obscured by visual elements of the user interface provided on the homescreen if the background wallpaper were generated based on the image and the current wallpaper generation parameters in either orientation.

Underneath the thumbnails 210a and 212a, there is provided a user interface menu 214 of options for adjusting the wallpaper generation parameters. The wallpaper generation parameters for the various options presented to the user are stored in RAM 110 but may be pre-programmed into the instructions providing the user interface functionality stored in memory 112 set out in embodiments described herein. The wallpaper generation parameters currently stored in RAM 110 are applied by the processor 102 in carrying out the instructions underlying the user interface functionality described herein to generate the preview thumbnails, and also to generate the actual wallpaper, if the preview thumbnails are accepted by the user. The wallpaper generation parameters may govern various aspects of the wallpaper generation such as the form of the image 200 input into the wallpaper generation process, the sizing of the image for the wallpaper, any stretching or altering of the aspect ratio, and any other image formatting parameters (for example, colour adjustments) that affect how the image is formatted as a background wallpaper in multiple orientations. Of course, the use of wallpaper generation parameters as set out herein is merely an explanatory example of how a wallpaper may be produced in multiple orientations based on an image. Other processing techniques are possible within other embodiments.

Figure 2C:
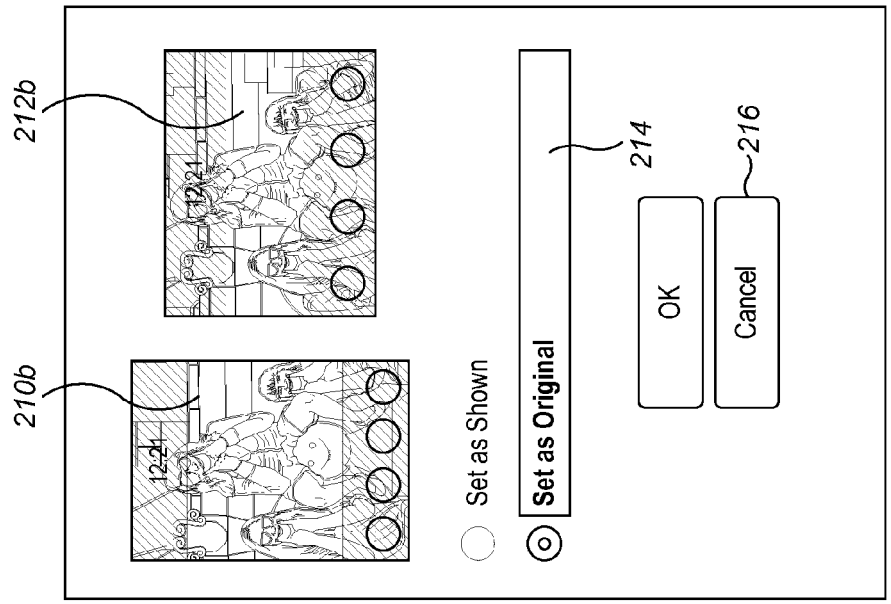
Figure 2D:
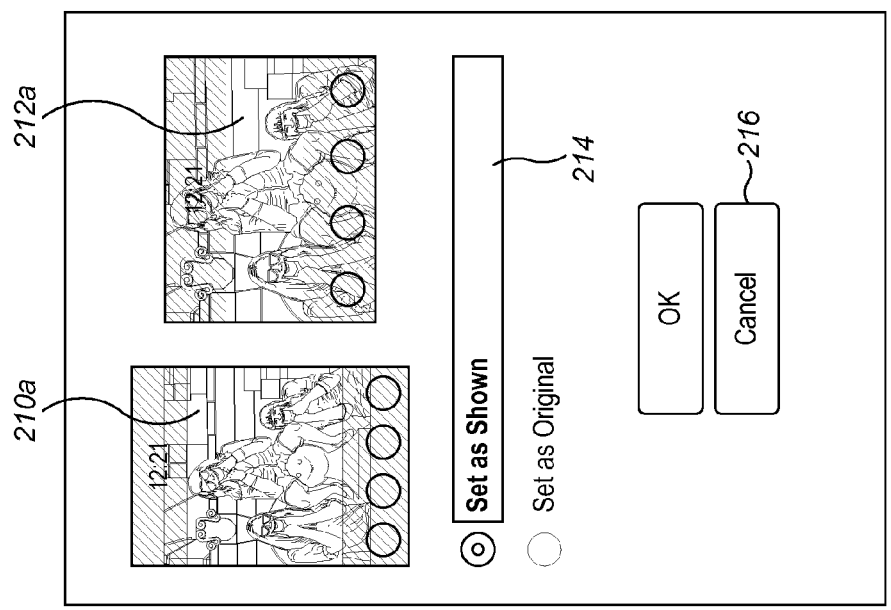

In FIG. 2C, the default wallpaper generation parameters are shown as the current selection in menu 214, identified as "Set as Shown". The "Set as Shown" default parameters are such that the wallpaper in the portrait orientation of the device would be generated as the image is shown in the picture viewer application as shown in FIG. 2A. Thus, as can be seen in FIG. 2C, the portrait thumbnail 210a includes a representation of the image 200 as a background wallpaper in the same view as shown in FIG. 2A, i.e. the representation reflects the width of the 1200×1200 pixel image fitted to the 360 pixel width of the portrait-aligned display 114. Thus the representation of the image 200 as the wallpaper is also shown in thumbnail 210a as having black bars or 'void spaces' of no image data at the top and bottom of the wallpaper. The landscape thumbnail 212a, however, is generated in accordance with the default wallpaper generation settings which, in this case, cause the image to be sized such that the 1200 pixel width of the image 200 'as shown' in the picture viewer application in FIG. 2A to be fitted to the 480 pixel width of the landscape-aligned display 114. Thus in the landscape thumbnail 212a the image 200 is represented such that banners of image data of image 200 are cropped off by the top and bottom of the display 114. Of course the 'Set as Shown' wallpaper generation parameters could alternatively be configured such that in the orientation(s) different from that shown in the picture viewer application, the image is not re-sized in this way.

In FIG. 2, the user interface menu 214 provides one other option for adjusting the wallpaper generation parameters, indicated as "Set as Original". If the user manipulates the user input to select this alternative option, the wallpaper generation parameters stored in the RAM 110 are updated to correspond to those associated with the "Set as Original" option and the thumbnails are generated afresh to provide thumbnails 210b, 212b, to reflect the change in the wallpaper generation parameters in the preview screen, as shown in FIG. 2D. In the "Set as Original" option, the wallpaper generation parameters are such that the image 200 is sized (while maintaining the aspect ratio of the image) to fill the area provided for the background wallpaper in both orientations, such that no black bars or 'void spaces' are shown while maintaining the aspect ratio of the image. Thus in the portrait thumbnail 210b, the image 200 is sized such that the full height of the 'Original' image 200 is displayed in the area of the thumbnail representing the area for the background wallpaper. This means that the size of the image 200 is such that its width is greater than the width of the area for displaying the background wallpaper. As such, vertical strips are cropped from the left and right sides of the centred image. In the thumbnail 212b, like in 212a shown in FIG. 2C, the image is sized such that the full width of the 'Original' image 200 is displayed in the area of the thumbnail representing the area for the background wallpaper. This means that the 1200 pixel width of the image 200 in FIG. 2A is fitted to the 480 pixel width of the landscape-aligned display 114, resulting in the loss of strips of image data at the top and bottom of the wallpaper.

Of course other options defining wallpaper generation parameters may be presented to the user, or the parameters described above may be different. For example, in one or both of a selectable pair of thumbnails the representation of the image or the representation of the user-defined view of the image may be sized: identically in both thumbnails; or to fill the area of the thumbnail representing the area for the background wallpaper; or so that the its entire extent is displayed in the area of the thumbnail representing the area for the background wallpaper; or so that its full width is displayed in the area of the thumbnail representing the area for the background wallpaper; or so that its full height is displayed in the area of the thumbnail representing the area for the background wallpaper.

The thumbnails are generated to provide a virtualised representation of how the wallpaper would be generated and how the user interface would appear including the wallpaper if the user were to select the 'OK' button from buttons 216 and accept the displayed thumbnails. That is, the wallpaper would be generated on the basis of the image (or the particular view thereof shown in the thumbnails (see below in relation to FIG. 3)) with the accepted wallpaper generation parameters. In this way, the user can have a preview of how the image 200 would appear as a final wallpaper before deciding whether or not to adopt that image on the basis of the thumbnails, and the user can have realistic expectations that the preview thumbnails will truly represent how the adopted wallpaper image would ultimately appear in use.

Thus if, on the basis of the thumbnails displayed for a given option, the user is satisfied that the image 200 as shown in the thumbnails is acceptable for use as the background wallpaper in both the landscape and portrait orientations, the user may select the "OK" button from buttons 216, in response to which the device generates the background wallpaper based on the image and the wallpaper generation parameters of the selected option. Alternatively, if the user deems the thumbnails unacceptable, the user may select the "Cancel" button, in which case the picture viewer application is once again shown (as in FIG. 2A).

Figure 3B:
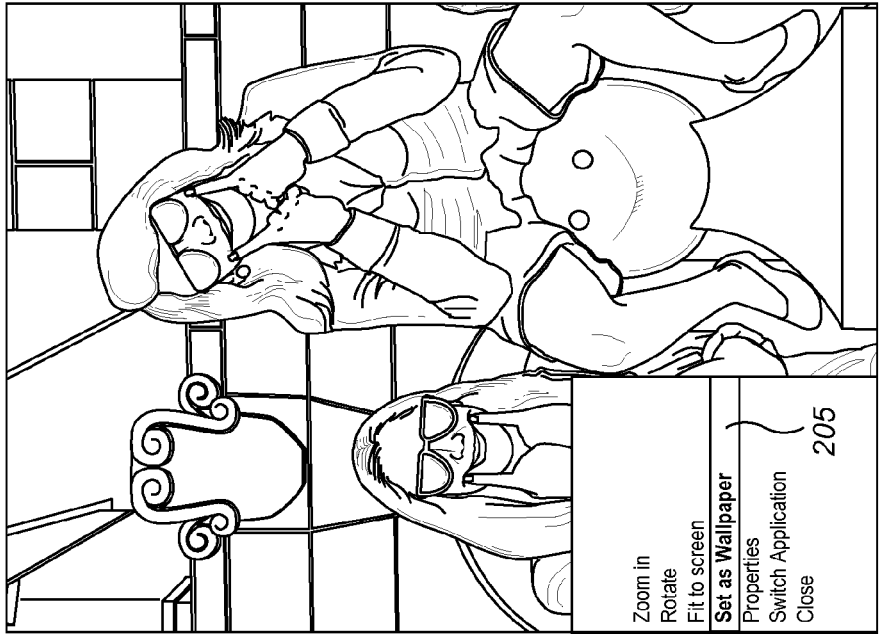
FIGS. 3A-3D illustrate a display of the embodiment of the portable electronic device as shown in FIGS. 2A-2D showing the operation of the user interface to enable the user to select a user-defined view of an image as a background wallpaper for the user interface of the device.
Figure 3A:
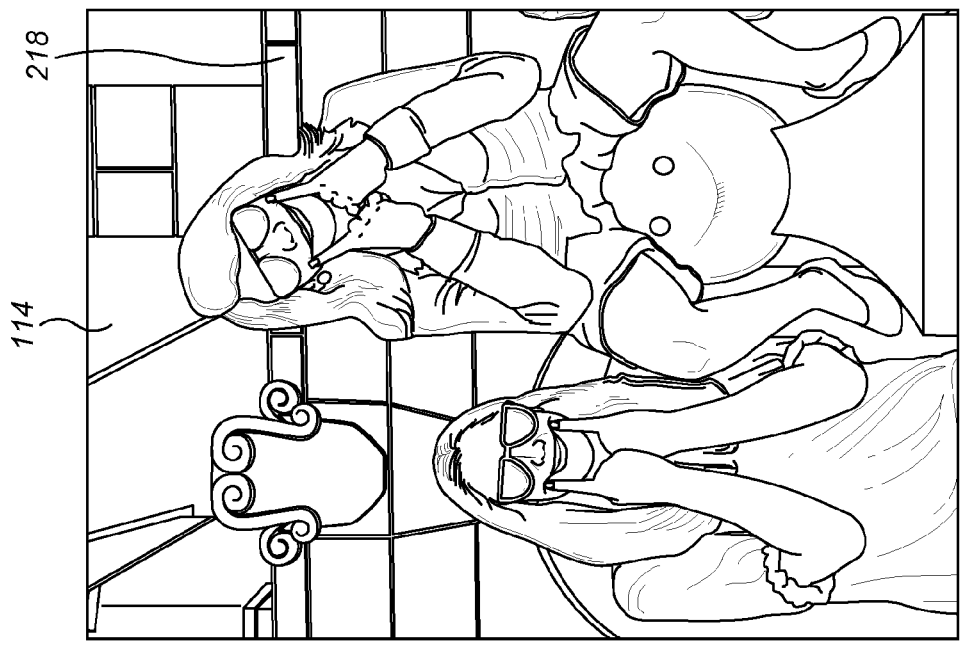
Figure 3C:
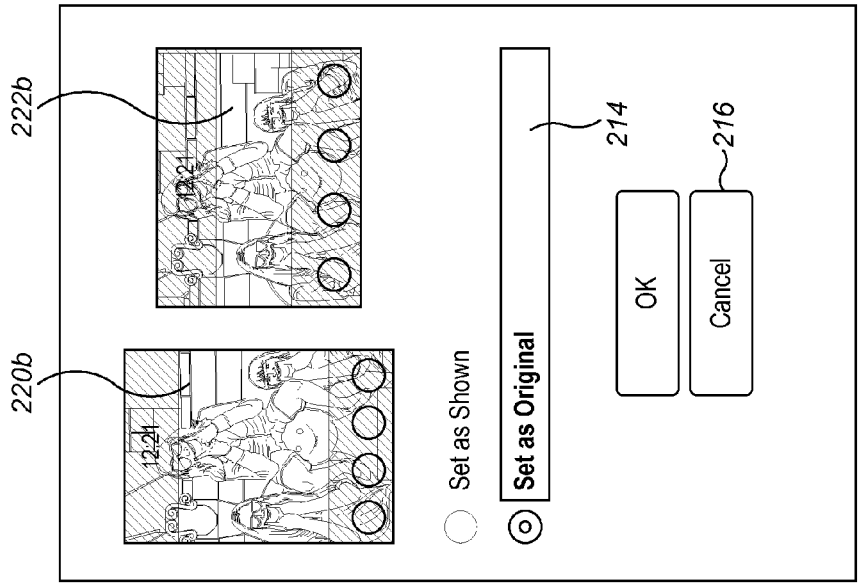
Figure 3D:
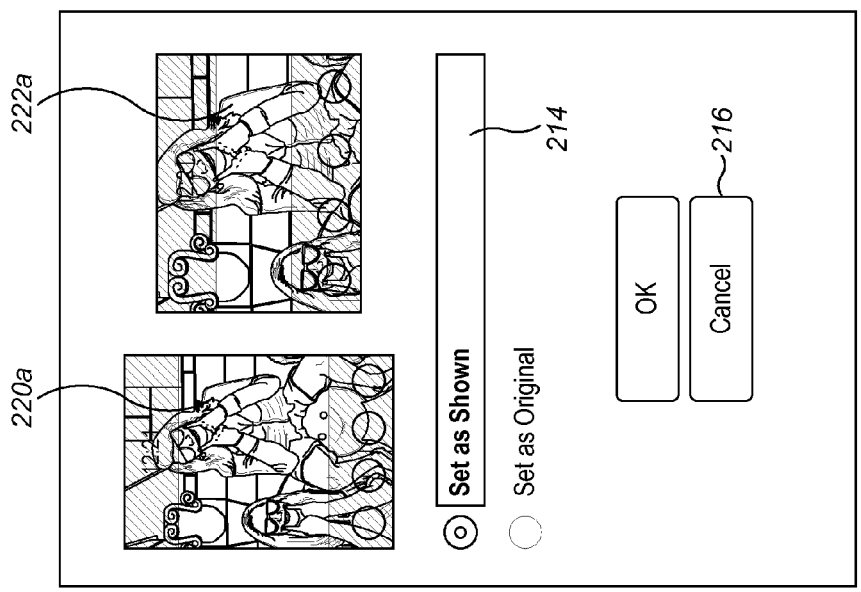
Figure 5B:
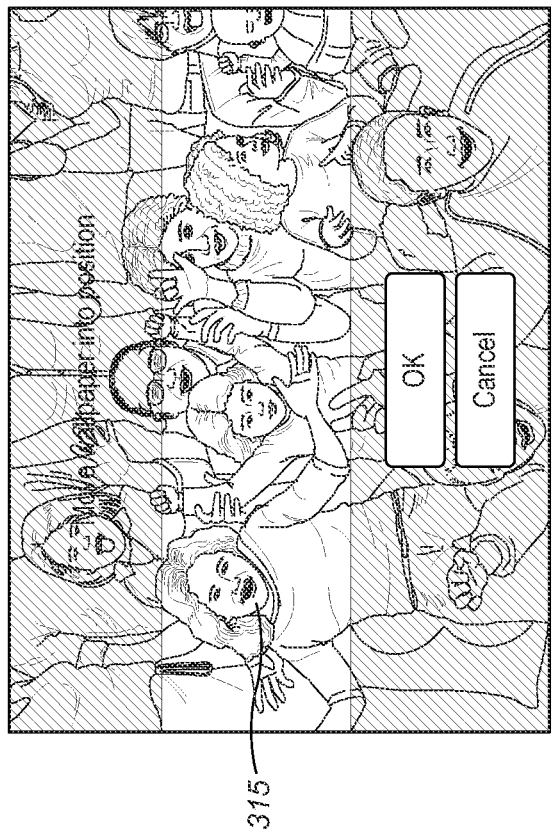
FIGS. 5A-5D illustrate a display of a portable electronic device in accordance with yet another embodiment showing the operation of an alternative user interface by which a user can manipulate an image for facilitating the selection of the image as a background wallpaper for the user interface of the device.
Figure 5A:
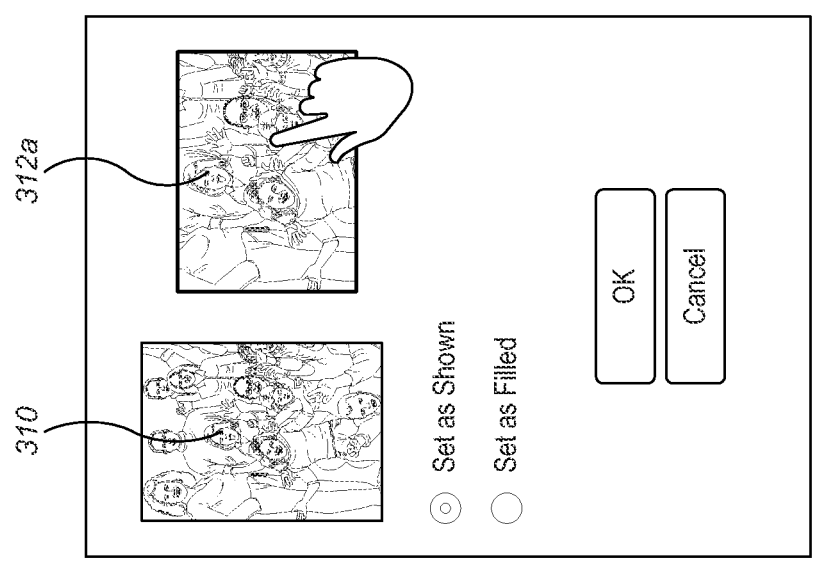
Figure 5D:
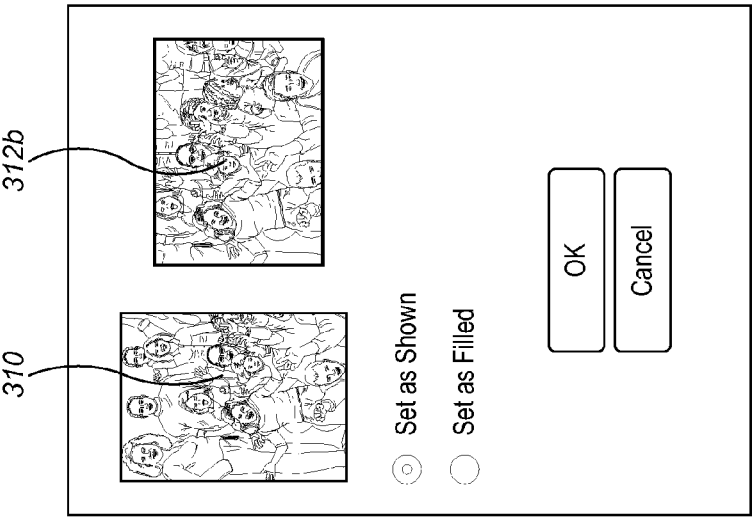
Figure 5C:
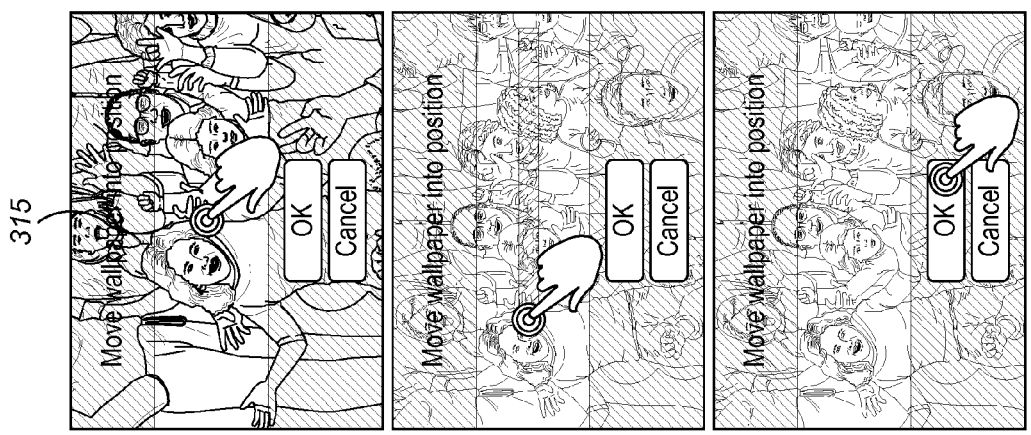

Referring now to FIG. 3, if the user wants to use a particular view of the image 200 as a wallpaper this may be achieved in the picture viewer application by the user performing manipulations of the touch-sensitive display screen 120 or of another user input to alter the view of the image 200 by, for example, using multitouch gestures to zoom, rotate and pan to provide a particular view of the image, and then selecting the 'Set as Wallpaper' option while that view is displayed (see FIG. 3B). As shown in FIG. 3A, the user has zoomed in on image 200 and panned to the left a little to provide a view 218 of image 200 that fills the screen and is focussed on the two girls on the left. In this case, the user may desire that this view 218 of image 200 in particular is used a background wallpaper.

In response to the selection of the 'Set as Wallpaper' option, the user interface functionality for facilitating the selection of an image as the background wallpaper is once again provided, in the same way as described in relation to FIG. 2 above. In this case, it can be seen that when the "Set as Shown" option is selected in the menu 214 (see FIG. 3C) the wallpaper generation parameters are such that the view 218 of the image 200 in the picture viewer application is used as the background wallpaper in portrait thumbnail 220a. In the landscape thumbnail 222a, the image is sized such that the width of the image 200 visible in the view 218 is shown across the full 480 pixel width of the display area of the wallpaper background in the landscape orientation, resulting in some image data at the top and bottom of view 218 of image 200 shown in portrait in the picture view application being cropped from the landscape thumbnail 222a. Selection of the "Set as Original" option in the menu 214 once again results in the same pair of thumbnails shown in FIG. 3D as shown in FIG. 2D because the wallpaper generation parameters for the "Set as Original" option use the original image 200 as an input, not the picture viewer view 218.

The user interface functionality for facilitating the selection of an image as the background wallpaper may, in certain embodiments, be provided with additional functionality enabling the user to separately manipulate the representation of the image shown in each of the thumbnails to adjust how the image would appear as a wallpaper background in that orientation. Thus if any thumbnail shows the image in an unacceptable position, orientation or size for use as a background wallpaper in a certain orientation, the user may adjust the image in relation to that thumbnail in order to achieve an acceptable view of the image for use as the background wallpaper in that orientation.

The manipulation of the representation of the image may achieved by the user manipulating the multitouch display using multitouch gestures used in the picture viewer application to adjust the panning/focus/position, rotation/orientation and size/zooming of the image. Other adjustments may of course be provided by the functionality.

In one embodiment, shown in FIG. 4, the user interface functionality is such that the representation of the image as the wallpaper background in a thumbnail is adjustable by directly manipulating the representation of the image in the thumbnail itself. For example, the view of the image shown as the background wallpaper in the landscape thumbnail 312a is considered by the user in FIG. 4A to have an unacceptable focus, and so the user pans the image to the right by touching and dragging the image in the thumbnail 312 to the left (see FIG. 4B) to provide an acceptable view of the image for the landscape background wallpaper, shown in thumbnail 312b in FIG. 4C.

Alternatively, or in addition, in other embodiments, as shown in FIG. 5, the user interface functionality for adjusting the thumbnail is such that the representation of the image as the wallpaper background in a thumbnail is adjustable by providing a full screen representation of the appearance of the display having the image as the background wallpaper corresponding to and in response to a selection of a thumbnail for adjustment, the representation of the image as the wallpaper background in the full screen representation being directly manipulatable. For example, the view of the image shown as the background wallpaper in the landscape thumbnail 312a is considered by the user in FIG. 5A to have an unacceptable focus, and so he selects the thumbnail 312a for adjustment by, for example, touching on the thumbnail on touch sensitive display 120. In response, a full screen representation 315 of the appearance of the display having the image as the background wallpaper corresponding to the selected thumbnail is provided. In this case, as the selected thumbnail is a landscape view, the full screen representation 315 is also shown in landscape orientation (see FIG. 5B), and the user may prefer to rotate the device on its side to facilitate the adjustment of the representation of the image 200 as the background wallpaper. The adjustment is shown in FIG. 5C in which the user pans the image 200 to the right by touching and dragging the image 200 in the full screen representation 315 to the left to provide an acceptable view of the image 200 for use as the background wallpaper in the landscape orientation. The user is provided with "OK" and "Cancel" buttons in full screen representation 315 to accept or reject the adjustments made to the image 200 in the full screen representation 315. Once the adjustment is accepted, the updated thumbnail 312b reflecting the adjustment is shown, as seen in FIG. 5D.

Figure 6:
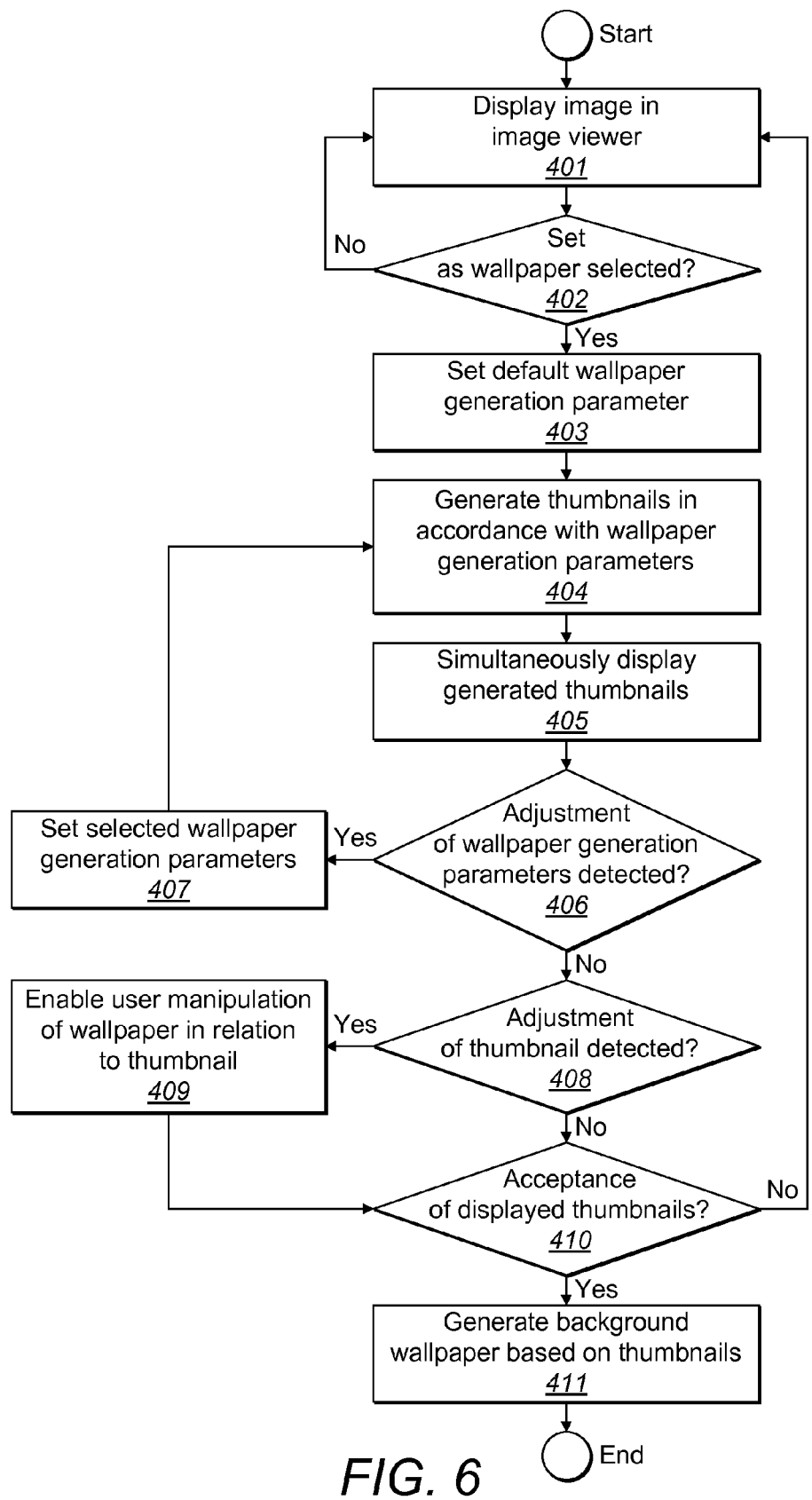
FIG. 6 shows a flow chart of the processes underlying the user interface functionality of certain embodiments for facilitating the selection of an image as a background wallpaper of a user interface of the device.

FIG. 6 shows a process flow chart setting out the processing underlying the operation of the user interface functionality of embodiments to facilitate the selection of an image (or a view thereof) for use as a background image in multiple orientations.

At 401 a picture viewer application is operating to display an image in the display screen 114. The user may manipulate the image in the picture viewer application to achieve a desired view.

At 402, if the "Set as Wallpaper" menu option is selected, the wallpaper generation parameters are set in the RAM as the default setting in 403, otherwise the picture viewer continues to display the image.

At 404, the thumbnails representative of how the display would appear including the image as the background wallpaper are generated in accordance with the stored wallpaper generation parameters (initially the default parameters), and they are simultaneously displayed on display at 405.

If the user selects an adjustment of the wallpaper generation parameters at 406, the wallpaper generation parameters stored in the RAM are re-set at 407 and the thumbnails are once again generated at 404 and the display refreshed at 405.

If the user selects an adjustment of a particular thumbnail at 408, functionality enabling the user manipulation of the wallpaper in relation to the selected thumbnail is provided at 409, and the adjusted thumbnail is displayed.

If the user selects to accept the image as the background wallpaper based on thumbnails at 410, the device generates the wallpaper for use in the multiple orientations based on the thumbnails and the wallpaper generation parameters at 411. If the user selects to reject the image as the background wallpaper at 411, the image is once again displayed on display in the picture view application.

In the present application, the sizing of an image refers generally to adjusting its size as represented on the display and is intended to include any processing that achieves that function, including but not limited to image scaling, upsampling, downsampling, supersampling, using suitable algorithms, zooming, etc.

In addition, as will be evident from the foregoing description, the thumbnail representation may or may not necessarily be a generated static computer image file but could be a 'live' mock up representing the user interface including the image as the background wallpaper achieved by a software simulation. The mock up thumbnail may be directly interactive, as shown in FIG. 4.

In the foregoing embodiments, only two orientations of the user interface and background wallpaper are provided by the device 100. Of course, in other embodiments, the electronic devices may provide more than two orientations of the user interface and background wallpaper, and the user interface functionality may provide a commensurate number of preview thumbnails. The number of thumbnails shown in the preview screen is of course not necessarily equal to the number of orientation in which a user interface, and the wallpaper, is to be displayed, and those presented may only be illustrative to the user, allowing the user a degree of control over the use of the image as the background. For example, the user interface and background may freely rotate, but the user interface functionality for facilitating the selection of an image as a background wallpaper may only provide 'portrait' and 'landscape' thumbnail previews in the way described above. Once the user has accepted the thumbnails, the background wallpaper for use at orientations between the portrait and landscape orientations may be 'interpolated' in some manner by the device to provide an acceptable use of the image as the background wallpaper in the portrait and landscape and the various intermediate orientations.

In the embodiments described above, a static two-dimensional image has been used as the background wallpaper. Of course, the use of the word image as set out herein is intended to encompass static images, dynamic images, moving images such as video images, and not only 2D images but also 3D stereoscopic images, should the display be capable of displaying such.

The invention claimed is:

1. A method of facilitating the provision of an image as a background wallpaper of a user interface for display on a display of an electronic device, the device being configured to display the user interface and wallpaper in first and second different orientations during use, comprising:
   generating, based on the image, a first thumbnail comprising a representation of the appearance of the display having the image as the background wallpaper in a first orientation showing how the features of the image may be obscured in use as the background wallpaper by features of the user interface when in the first orientation;
   generating, based on the image, a second thumbnail comprising a representation of the appearance of the display having the image as the background wallpaper in a second orientation showing how the features of the image may be obscured in use as the background wallpaper by features of the user interface when in the second orientation;
   simultaneously displaying on the display the first and second thumbnails; and
   providing user interface functionality enabling the user to separately manipulate the representation of the image shown in each of the first and second thumbnails to adjust how the image would appear as a wallpaper background in that orientation, wherein providing the user interface functionality comprises:
      providing a full screen representation of the appearance of the display having the image as the background wallpaper corresponding to and in response to a selection of a thumbnail for adjustment,
      adjusting the representation of the image as the wallpaper background in the full screen representation relative to overlying user interface features responsive to touch gestures detected on the touch screen in relation to the background wallpaper; and
      simultaneously re-displaying on the display the first and second thumbnails when adjustments made to the representation of the image in the full screen representation are accepted or rejected,
      wherein, if the user accepts the adjustments, the thumbnail selected for adjustment is updated before being displayed to reflect the accepted adjustments.

2. The method of claim 1, further comprising providing functionality allowing the user to selectably cause the generation and display of different pairs of first and second thumbnails in which the image is represented in different ways to provide the background wallpaper.

3. The method of claim 2, wherein in a selectable pair of thumbnails the representation of the image is based on a user-defined view of the image.

4. The method of claim 3, wherein the user-defined view of the image is generated by user interaction with an image viewer application.

5. The method of claim 2, wherein in a selectable pair of thumbnails the representation of the image is based on the original image.

6. The method of claim 3, wherein in a selectable pair of thumbnails the representation of the image or the representation of the user-defined view of the image is sized:
   identically in both thumbnails; or
   to fill the area of the thumbnail representing the area for the background wallpaper; or
   so that the its entire extent is displayed in the area of the thumbnail representing the area for the background wallpaper; or
   so that its full width is displayed in the area of the thumbnail representing the area for the background wallpaper; or
   so that its full height is displayed in the area of the thumbnail representing the area for the background wallpaper.

7. The method of claim 1, wherein the aspect ratio of the image is maintained in the first and second thumbnails.

8. The method of claim 1, further comprising providing user interface functionality enabling the user to select the use of the image as the background wallpaper based on the selected thumbnail images.

9. The method of claim 8, further comprising generating first and second versions of the image in accordance with the representation of the image in the selected thumbnails for use as the background wallpaper in the first and second orientations.

10. The method of claim 1, wherein the first and second orientations correspond to portrait and landscape.

11. The method of claim 1, wherein the display is a multitouch display and the manipulation of the representation of the image is achieved by the user manipulating the multitouch display.

12. The method of claim 1, wherein the user interface functionality is such that the representation of the image as the wallpaper background in a thumbnail is adjustable by directly manipulating the thumbnail itself.

13. The method of claim 1, wherein the thumbnails include representations of visual elements of the user interface that can appear in relation to the background wallpaper in use.

14. The method of claim 1, wherein the thumbnails are simultaneously displayed having the same orientation on the display.

15. An electronic device comprising:
a display;
one or more processors; and
memory comprising instructions for facilitating the provision of an image as a background wallpaper of a user interface for display on the display, the device being configured to display the user interface and wallpaper in first and second orientations during use, which when executed by one or more of the processors cause the electronic device to:
generate, based on the image, a first thumbnail comprising a representation of the appearance of the display having the image as the background wallpaper in a first orientation showing how the features of the image may be obscured in use as the background wallpaper by features of the user interface when in the first orientation;
generate, based on the image, a second thumbnail comprising a representation of the appearance of the display having the image as the background wallpaper in a second orientation different from the first orientation showing how the features of the image may be obscured in use as the background wallpaper by features of the user interface when in the second orientation;
simultaneously display on the display the first and second thumbnails; and
provide user interface functionality enabling the user to separately manipulate the representation of the image shown in each of the first and second thumbnails to adjust how the image would appear as a wallpaper background in that orientation, wherein the user interface functionality is such that:
a full screen representation of the appearance of the display having the image as the background wallpaper corresponding to and in response to a selection of a thumbnail for adjustment is provided,
the representation of the image as the wallpaper background in the full screen representation is adjusted relative to overlying user interface features responsive to touch gestures detected on the touch screen in relation to the background wallpaper, and
the first and second thumbnails are simultaneously re-displayed on the display when adjustments made to the representation of the image in the full screen representation are accepted or rejected,
wherein, if the adjustments are accepted, the thumbnail selected for adjustment is updated before being re-displayed to reflect the accepted adjustments.

16. The electronic device of claim 15, further comprising:
means for detecting the orientation of the device, the device being configured to select the orientation of the displayed user interface based on the detected orientation of the device.

17. A computer program product comprising:
memory comprising instructions for facilitating the provision of an image as a background wallpaper of a user interface for display on a display of an electronic device, the device being configured to display the user interface and wallpaper in first and second orientations during use, which when executed by one or more of the processors of the device cause the device to:
generate, based on the image, a first thumbnail comprising a representation of the appearance of the display having the image as the background wallpaper in a first orientation showing how the features of the image may be obscured in use as the background wallpaper by features of the user interface when in the first orientation;
generate, based on the image, a second thumbnail comprising a representation of the appearance of the display having the image as the background wallpaper in a second orientation different from the first orientation showing how the features of the image may be obscured in use as the background wallpaper by features of the user interface when in the second orientation;
simultaneously display on the display the first and second thumbnails; and
provide user interface functionality enabling the user to separately manipulate the representation of the image shown in each of the first and second thumbnails to adjust how the image would appear as a wallpaper background in that orientation,
wherein the user interface functionality is such that:
a full screen representation of the appearance of the display having the image as the background wallpaper corresponding to and in response to a selection of a thumbnail for adjustment is provided,
the representation of the image as the wallpaper background in the full screen representation is adjusted relative to overlying user interface features responsive to touch gestures detected on the touch screen in relation to the background wallpaper, and
the first and second thumbnails are simultaneously re-displayed on the display when adjustments made to the representation of the image in the full screen representation are accepted or rejected,
wherein, if the adjustments are accepted, the thumbnail selected for adjustment is updated before being re-displayed to reflect the accepted adjustments.

* * * * *